US011203369B2

(12) United States Patent
McMillan (10) Patent No.: US 11,203,369 B2
(45) Date of Patent: Dec. 21, 2021

(54) DOLLY ASSEMBLY (71) Applicant: Howard McMillan, Brighton, MI (US)

(72) Inventor: Howard McMillan, Brighton, MI (US)

(*) Notice: Subject to any disclaimer, the term of this patent is extended or adjusted under 35 U.S.C. 154(b) by 172 days.

(21) Appl. No.: 16/728,484

(22) Filed: Dec. 27, 2019

(65) Prior Publication Data
US 2021/0197878 A1 Jul. 1, 2021

(51) Int. Cl.
B62B 3/02 (2006.01)
B62B 3/06 (2006.01)
B60B 33/00 (2006.01)

(52) U.S. Cl.
CPC ............... B62B 3/02 (2013.01); B62B 3/06 (2013.01); B60B 33/00 (2013.01)

(58) Field of Classification Search
CPC .............. B62B 3/02; B62B 3/06; B60B 33/00
See application file for complete search history.

(56) References Cited

U.S. PATENT DOCUMENTS

| 3,471,047 | A |   | 10/1969 | Burke |            |
|-----------|---|---|---------|-------|------------|
| 3,524,412 | A |   | 8/1970  | Wilson |           |
| 3,882,796 | A | * | 5/1975  | Andreini | ............ B65D 19/0048 |
|           |   |   |         |       | 108/57.29 |
| 4,127,202 | A | * | 11/1978 | Jennings | ................ B60D 1/173 |
|           |   |   |         |       | 280/408   |
| 4,930,967 | A | * | 6/1990  | Dovidauskas | ............ B60P 3/10 |
|           |   |   |         |       | 414/373   |
| 5,037,265 | A | * | 8/1991  | O'Brien | ................. B65G 13/00 |
|           |   |   |         |       | 414/373   |
| D354,598  | S | * | 1/1995  | Poten | ........................... 280/79.4 |
| 5,433,576 | A | * | 7/1995  | Drew | ........................ B60P 1/43 |
|           |   |   |         |       | 414/343   |
| 5,711,540 | A | * | 1/1998  | Nesting | ...................... B62B 3/16 |
|           |   |   |         |       | 280/33.998 |
| 5,829,947 | A |   | 11/1998 | Litten |           |
| 6,095,746 | A | * | 8/2000  | Bergin | .................. B62B 5/0083 |
|           |   |   |         |       | 269/17    |
| 6,257,152 | B1| * | 7/2001  | Liu | ........................... B62B 3/16 |
|           |   |   |         |       | 108/53.3  |
| 6,349,656 | B1| * | 2/2002  | Mitchell | ............ B65D 19/0087 |
|           |   |   |         |       | 108/53.1  |
| 6,561,530 | B2| * | 5/2003  | Carbonero | ......... A63C 17/0033 |
|           |   |   |         |       | 280/79.11 |
| 6,860,496 | B2|   | 3/2005  | Novak et al. |      |
| 6,979,005 | B1| * | 12/2005 | McLerran | ................. B62B 3/00 |
|           |   |   |         |       | 108/53.1  |
| 7,293,508 | B2| * | 11/2007 | Johnson | ................. B65D 19/00 |
|           |   |   |         |       | 108/51.11 |

(Continued)

FOREIGN PATENT DOCUMENTS

| EP | 0950625 A2 | * | 10/1999 | ............. B65H 19/12 |
|----|------------|---|---------|-------------------------|
| EP | 2428428 A1 | * | 3/2012  | ............... B62B 3/04 |

(Continued)

Primary Examiner — Jacob B Meyer
(74) Attorney, Agent, or Firm — Fishman Stewart PLLC (57) ABSTRACT A dolly assembly includes a dolly having an upper surface and a lower surface, and an aperture passing into at least the lower surface, and a ramp having an extension that extends beyond an edge of the ramp, the extension having at least one upward-facing ramp nub that, when positioned in the aperture, the ramp and the dolly are locked together as a unit.

20 Claims, 10 Drawing Sheets (56) References Cited

U.S. PATENT DOCUMENTS

| | | | | |
|---|---|---|---|---|
| 8,029,006 B2* | 10/2011 | Kalajyan | .................... | B62B 3/16 |
| | | | | 280/33.998 |
| 8,832,892 B2 | 9/2014 | Goin et al. | | |
| 9,045,253 B2 | 6/2015 | Hacko et al. | | |
| 9,266,458 B2 | 2/2016 | Michaud | | |
| 9,573,421 B2* | 2/2017 | Tiilikainen | .......... | B60B 33/0005 |
| 9,635,778 B2* | 4/2017 | Tsai | ........................ | H05K 7/18 |
| D804,135 S * | 11/2017 | McMillan | ...................... | D34/23 |
| 10,065,666 B2* | 9/2018 | Nussbaum | ................ | B62B 3/16 |
| 10,494,141 B2* | 12/2019 | Wood | .................... | B62B 5/0093 |
| 2003/0205877 A1 | 11/2003 | Verna et al. | | |
| 2008/0302585 A1* | 12/2008 | Perelli | ................... | B62B 5/0076 |
| | | | | 180/14.1 |
| 2009/0191035 A1* | 7/2009 | LaBruyere | ............ | B62B 5/0083 |
| | | | | 414/427 |
| 2012/0043732 A1 | 2/2012 | Itmec et al. | | |
| 2014/0033956 A1* | 2/2014 | Kelly | ...................... | B62B 5/049 |
| | | | | 108/50.11 |
| 2015/0129588 A1* | 5/2015 | Cline | ................. | B65D 19/0026 |
| | | | | 220/1.5 |
| 2016/0075362 A1* | 3/2016 | Della Polla | ............. | B62B 3/005 |
| | | | | 280/79.11 |
| 2016/0297458 A1 | 10/2016 | Churchvara et al. | | |
| 2017/0001755 A1* | 1/2017 | Clark | .................. | B65D 19/0036 |
| 2017/0113863 A1* | 4/2017 | Cline | .................... | B65D 19/10 |
| 2017/0183042 A1 | 6/2017 | Eagan, Jr. | | |
| 2017/0190342 A1* | 7/2017 | Nussbaum | ................ | B62B 3/16 |
| 2017/0190343 A1* | 7/2017 | Nussbaum | ................ | B62B 5/06 |
| 2017/0197783 A1* | 7/2017 | Lundquist | ............. | B65F 1/1615 |
| 2018/0009604 A1 | 1/2018 | Davison, Jr. | | |
| 2018/0022155 A1* | 1/2018 | Davis | .................... | B62B 5/0089 |
| | | | | 414/469 |
| 2018/0127149 A1* | 5/2018 | Clark | ...................... | B65D 19/04 |
| 2018/0186513 A1 | 7/2018 | Brunner | | |
| 2018/0319418 A1 | 11/2018 | Kim | | |
| 2018/0319608 A1 | 11/2018 | Kun | | |
| 2019/0023297 A1 | 1/2019 | Torrison | | |
| 2019/0055057 A1* | 2/2019 | Wood | .................... | B65D 19/385 |
| 2019/0106244 A1 | 4/2019 | Brunner et al. | | |
| 2019/0270467 A1 | 9/2019 | Thibault | | |
| 2021/0197878 A1* | 7/2021 | McMillan | ................ | B62B 3/04 |

FOREIGN PATENT DOCUMENTS

| | | | | |
|---|---|---|---|---|
| GB | 2310836 A | * | 9/1997 | .......... B25H 1/0014 |
| GB | 2416527 A | | 2/2006 | |
| JP | 05116603 A | * | 5/1993 | ............. B66F 7/246 |
| WO | WO-9706080 A1 | * | 2/1997 | ............ B65F 1/1646 |

* cited by examiner

DOLLY ASSEMBLY

FIELD OF TECHNOLOGY

The present disclosure relates to dollies for movement of materials in warehouses.

BACKGROUND

Warehouses are used for storing equipment often shipped from manufacturers or used to temporarily store the equipment as inventory before purchase. In some instances, warehouses are used to stage the movement of equipment so that it may be moved in large numbers for temporary or long-term storage, before it is subsequently shipped from the warehouse to various distribution points, to the purchaser, or to another warehouse. It is often necessary to move equipment within a warehouse either manually or via a forklift.

Such equipment may include but is not limited to office equipment (such as printers, copiers, fax machines, computers, and the like), file cabinets, and furniture. For the purposes of this disclosure, equipment may refer to any item or items that may be moved via a dolly in an environment such as a warehouse.

Oftentimes, wheels are included on the equipment that may be used to roll the equipment. However, wheels provided on the equipment are typically designed only for moving the equipment in an office setting (i.e., where it will be used), which may be carpeted or have hard and smooth floors, and in some instances wheels may not be included at all (such as a file cabinet).

For office equipment that does include wheels, the wheels are typically not sized for movement within the relatively large distances within a warehouse. Moving such equipment over large distances in a warehouse can be inconvenient because, not only are the wheels small, there may be practical limits on how fast such a piece of equipment can be moved. In addition, warehouse floors may be strewn with materials, garbage, gravel, and the like and moving equipment on the equipment's wheels can be hazardous, while having a risk of tipping over and causing damage to the equipment.

For office equipment that does not include its own wheels, movement within a warehouse can be challenging because there may not be a convenient way to move the equipment via forklift, or there may not be convenient handles on the equipment for an operator or mover to grab onto.

In addition, a person moving equipment may be operating alone and may not have an opportunity to obtain help to move a heavy piece of equipment, necessitating either that the person wait until additional help can be found, or that the person may try to move the equipment alone—which can increase the likelihood of accidental damage occurring to the equipment.

Dollies are typically used to move equipment in a warehouse and in other settings. A dolly typically includes a frame of wooden planks attached to one another to form a square or rectangle, having typically four wheels or castors with each located near each corner. Although dollies can be convenient to use, they can be cumbersome because they may not have a flat platform to load the equipment onto, and because it can be difficult to load heavy equipment onto them. For instance, a heavy printer on a set of its own wheels may be tipped onto two of its wheels, or tipped on its base (if no wheels), and a dolly can be moved underneath and set upon the dolly. The dolly, however, can "kick out" unexpectedly and it is often preferred to have more than one person to help load the equipment onto the dolly. Loading onto the dolly can be awkward and can risk damaging the equipment if something goes awry.

Thus, although dollies can provide a convenient way to move relatively heavy equipment, it is often necessary to have more than one person present to move such equipment to avoid accidental damage.

Further, dollies themselves may not typically provide a platform to store the equipment for short periods of time. Warehouses may include platforms or large shelves positioned above ground level for providing multiple levels of storage to make efficient use of storage space. For instance, ground level may have above it a first platform a few meters off the ground, and then a second or more platforms above that. A forklift may then be used to lift the equipment from ground level up to the first or higher platform. However, if moved to the location on, for instance, a dolly, it is typically undesirable to lift the dolly (with the equipment on it) to one of the higher platforms because the dolly can roll. As such, it is common to use a platform commonly known as a "skid", which provides a stable base, without wheels, for storing equipment while providing convenient locations for the forks of a forklift to pass through for lifting via the forklift. Skids themselves can sometimes be cumbersome to work with and can be difficult to load and move equipment on because the equipment must be lifted onto the skid and secured before moving the skid to its storage location.

Thus, although dollies have been in use for years, to best avoid damage and potential injury to movers, they may be used with two or more operators to minimize such risk, and use by a single operator therefore can increase the likelihood of damage or injury. And, skids themselves may be difficult to load and unload from dollies when dollies are in use.

There therefore remains a need for improving dollies for the safe and efficient movement of equipment.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

The present disclosure provides generally for a dolly and a ramp for attaching thereto, for conveniently moving equipment from the floor to the dolly without tipping the dolly or the equipment during the move.

Figures 1A, 1B, 2:
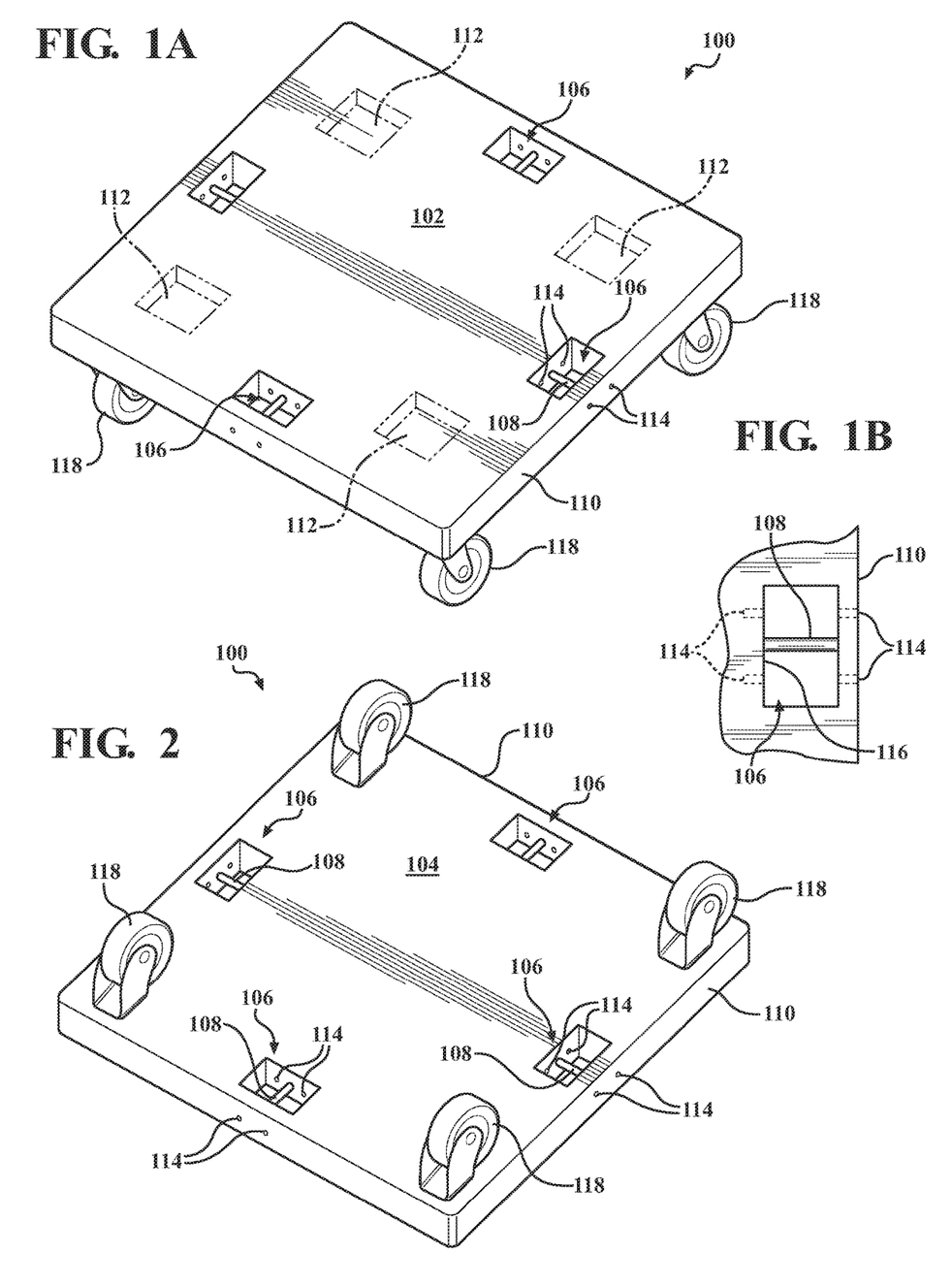
FIG. 1A is a top perspective view of a dolly according to the disclosure.
FIG. 1B is a close-up planar view of an aperture in the dolly of FIG. 1A.
FIG. 2 is a bottom view of the dolly of FIG. 2.

Referring to FIGS. 1A, 1B, and 2, an exemplary view of a dolly 100 is shown. Dolly 100 includes an upper surface 102 and a lower surface 104. In one example and as illustrated, upper surface 102 and lower surface 104 are planar surfaces. Dolly 100 includes apertures 106 passing into lower surface 104. A representative aperture 106 is illustrated in a close-up planar view in FIG. 1B. Aperture 106 includes a wrung, crosspiece, or bar 108 that extends generally perpendicular to respective outer edges 110. Rung 108 is generally made of metal, but may be made of a very hard plastic or other material sufficient to provide adequate strength to have attached thereto a strap or other device, for strapping or harnessing material such as an object or a piece of equipment to upper surface 102. According to one example, dolly 100 optionally includes one or multiple depressions 112 having a depth sufficient to contain a wheel and prevent the wheel from moving out of depression 112 during movement of dolly 100.

Optionally, each aperture 106 includes dolly pin holes 114 that pass from outer edges 110 and extending to either side of rungs 108. Pin holes 114 further, according to this optional example, extend beyond aperture 106 and into an inner surface 116 of each aperture 106. Dolly 100 includes wheels or castors 118 attached to lower surface 104.

Figure 3:
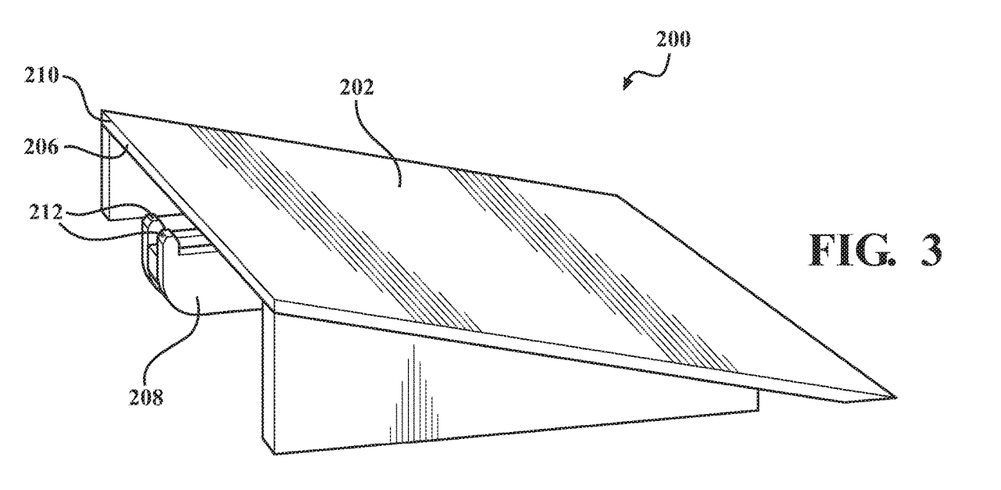
FIG. 3 is a perspective view of a ramp according to the disclosure.
Figure 4:
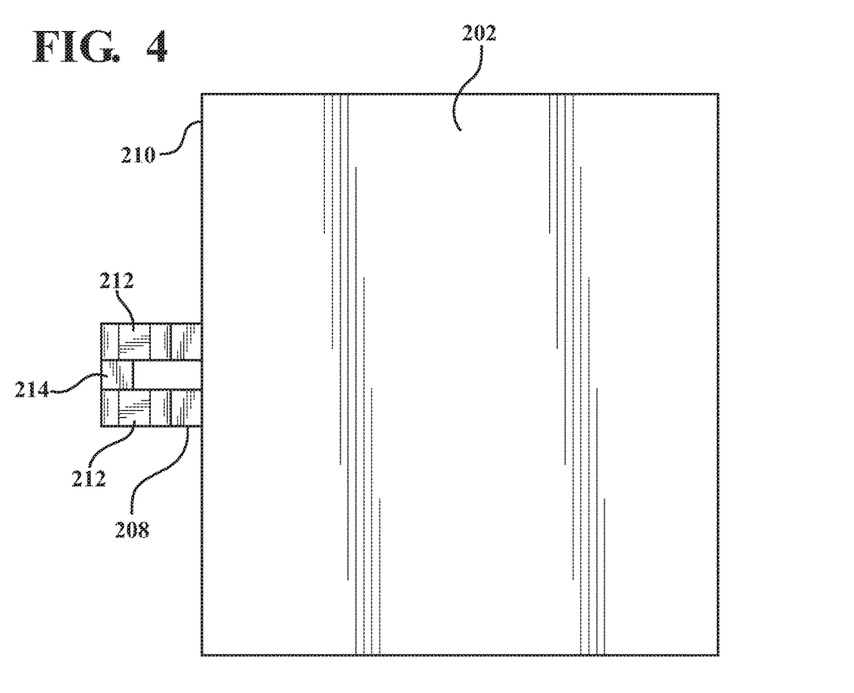
FIG. 4 is a top view of the ramp of FIG. 3.

Referring to FIGS. 3 and 4, a ramp 200 includes an upper planar surface 202 that extends from a lower or floor surface 204 to a height 206 that corresponds generally with that of upper surface 102 of dolly 100. Ramp 200 includes an extension 208 that extends beyond an edge 210 of ramp 200, extension 208 having at least one upward-facing ramp nub 212. Ramp nub 212 is configured such that, when positioned in aperture 106 of dolly 100, ramp 200 and dolly 200 are locked together as a single unit. FIG. 4 shows a top view of ramp 200 of FIG. 3, and includes edge 210, extension 208 extending therefrom, and ramp nubs 212. Optionally, a center attachment 214 extends between ramp nubs 212 to provide strength and support between ramp nubs 212.

Figure 5A:
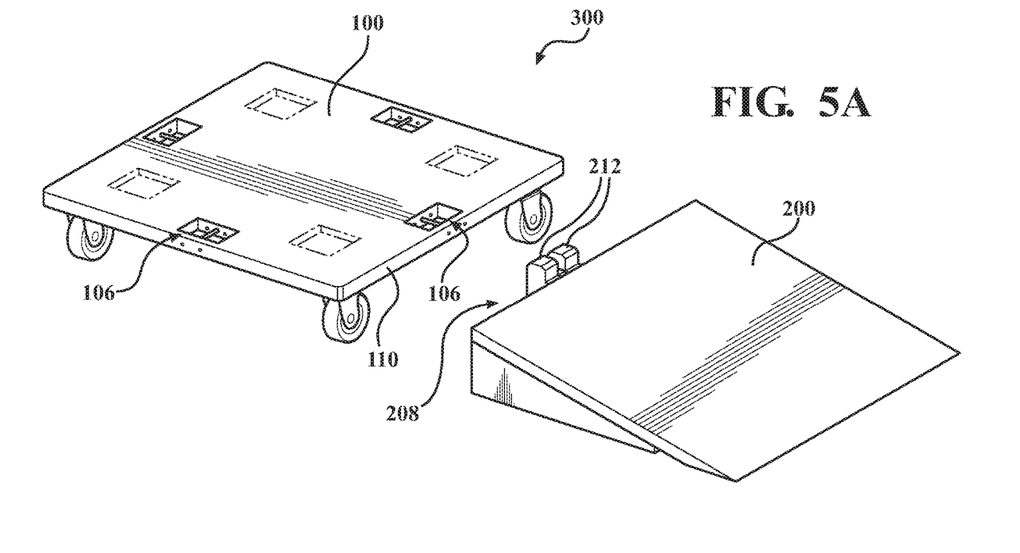
FIGS. 5A-5C show the ramp and dolly being assembled to a single unit.
Figure 5B:
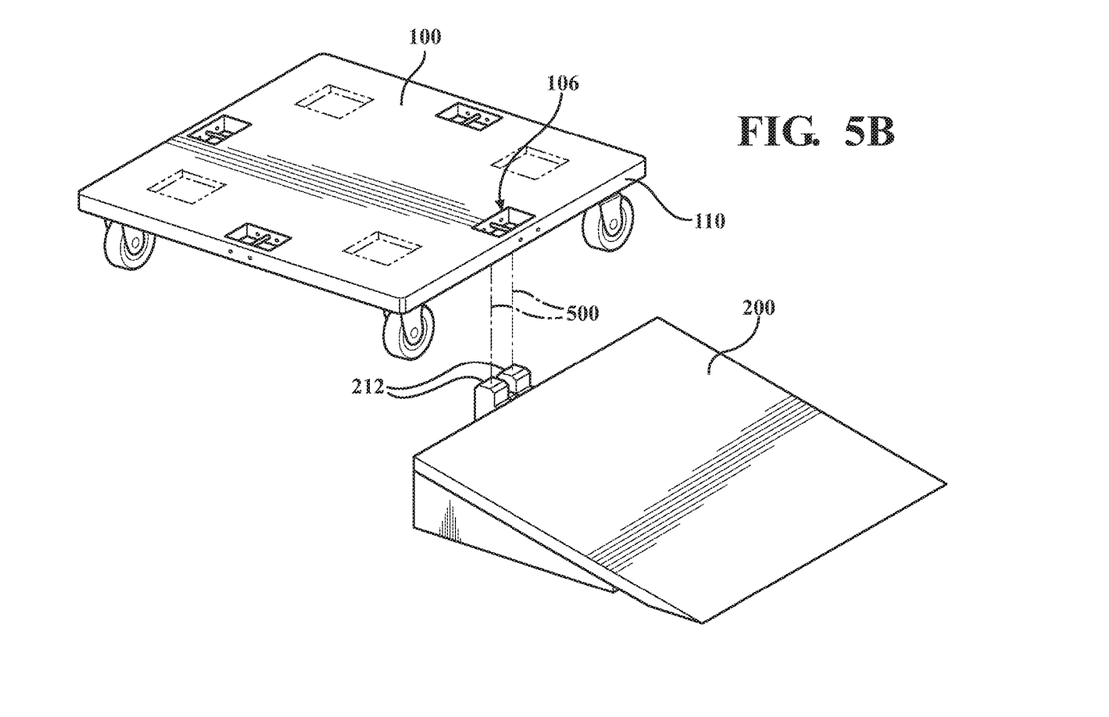
Figure 5C:
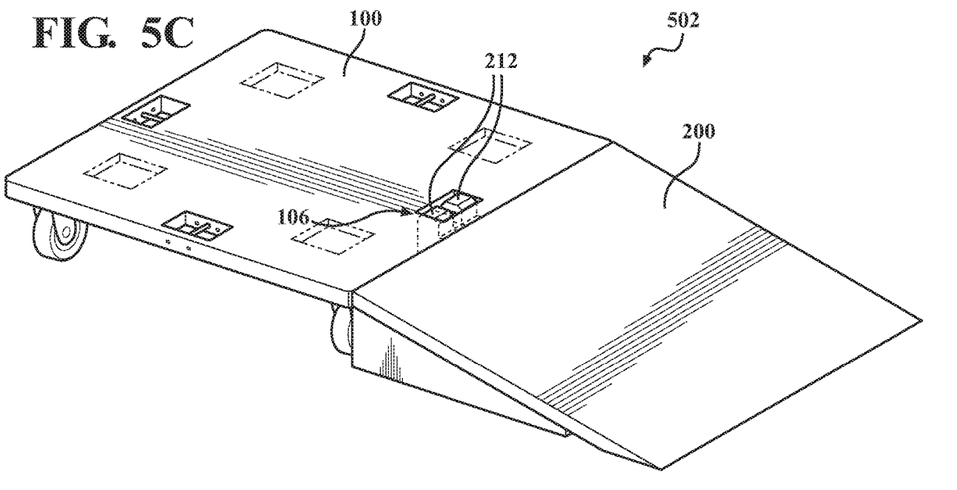

Referring to FIGS. 5A-5C, ramp 200 and dolly 100 are assembled together as a single unit 300. FIG. 5A shows dolly 100 and ramp side-by-side and in position to form the two as a single unit 300. As shown, ramp nubs 212 are faced toward one of the outer edges 110 of dolly 100 and in position to be placed within one of apertures 106. In FIG. 5B, dolly 100 is lifted such that aperture 106 as labeled is positioned above ramp nubs 212, and showing a path 500 for dolly 100 to be moved such that ramp nubs 212 and its aperture 106 are aligned.

FIG. 5C shows dolly 100 and ramp 200 positioned side-by-side and attached to one another as a single unit 502, via ramp nubs 212 and aperture 106. As such, single unit 502 is positioned and ready for a piece of equipment, such as an office printer, to be rolled up ramp 200 onto dolly 100, attached thereto, and in a fashion where dolly 100 is not prone to be flipped or otherwise inadvertently moved during the process. In other words, if a printer or other wheeled device were to be positioned on a dolly, such as dolly 100, but without ramp 200, dolly 100 would be prone to moving, tilting, or flipping during the process. To reduce the propensity for this to occur, as is commonly done a second person may be used to hold stable the dolly while the equipment is moved or lifted onto the dolly. To prevent such operations from occurring, and according to the disclosure, ramp 200 attached to dolly 100 thereby are locked together via ramp nubs 212 and aperture 106, forming single unit 502. Further, ramp nubs 212 include, as shown, two upward-facing ramp nubs 212 that are positioned laterally with respect to one another, each of the two upward-facing ramp nubs 212 extending to either side of rung 108 of dolly 100, as shown in FIGS. 1A, 1B, and 2.

Accordingly, it is contemplated that ramp nubs 212 are sized to fit snuggly within aperture 106, and are tolerance in such a fashion that ramp nubs 212 fit but without having extensive or additional play or clearance therebetween. It is also contemplated that ramp nubs 212 are positioned apart from one another in order that rung 108 is positioned therebetween, as well. Further, to facilitate installation of ramp nubs 212 within aperture 106, in one example ramp nubs 212 may include chamfered (as shown) or rounded ends to reduce the propensity for ramp nubs 212 to get hung up on the edges of aperture 106 when being installed or inserted therein. As such, ramp nubs 212 pass to and in the illustration are generally coplanar with upper surface 102, which minimizes surface disruptions of upper surface 102 to reduce the propensity for wheels to get hung up as they pass over aperture 106. This arrangement likewise provides for placement of rung 108 in aperture 106, which remains available for attaching items to upper surface 102. Further, because each of apertures 106 includes rung 108, it is contemplated that ramp 200 may be positioned against any of the four outer edges 110 of dolly 100 and ramp nubs 212 fit to either side of rung 108 in any of apertures 106. Thus, when setting up dolly 100 with ramp 200, any of the outer edges 110 may be used, which provides for convenient and quick setup of the two without having the inconvenience of having to rotate dolly 100 to find any particular aperture 106. Optional depressions 112 provide a modest depth to reduce the propensity of wheels to roll when positioned therein, but are not too deep so as to disrupt the surface and cause equipment to tip over when wheels of the equipment are passing over depressions 112.

In addition and according to one example, it is contemplated that rung 108 of dolly 100 is at an elevation that rests on center attachment 214 when dolly 100 and ramp 200 are attached together as a single unit. In such fashion, additional support is provided to dolly 100 when equipment is rolled up ramp 200 and onto dolly 100. And, when doing so, the support provided at the location of rung 108 and center attachment 214 thereby passes the load of the equipment all the way to the floor underneath ramp 200 and dolly 100. Further, the support provided at this location in combination with castors 118 that are nearest ramp 200 form a three point contact, or tripod with the ground, which is inherently stable when equipment is positioned thereon. That is, rung 108 and center attachment 114 provide a first load path to the floor beneath, and the two castors 118 nearest ramp 200 provide two additional load paths, for three total, which provide a temporary three-point or tripod support near edge 210 of ramp 200 when equipment is wheeled up ramp 200. Once the equipment passes more fully onto the dolly, then the load is transferred to the other two castors 118 that are on the far side or away from ramp 200. Once the equipment is fully positioned on dolly 200, then all four castors 118 carry the load and the support through rung 108/center attachment 114 is no longer necessary. Further, because rung 108/center attachment 114 provides this temporary load path to the ground and during loading equipment onto dolly 100, it is understood that castors 118 need not be placed at the corners of dolly 100, but may be placed inboard of the edges of dolly 100, as the propensity for dolly 100 to tip is eliminated.

According to one aspect and as shown, aperture or apertures 106 pass through both lower surface 104 and upper surface 102 of dolly 100. However, it is contemplated that in one example aperture 106 only passes through lower surface 104 and does not pass all the way through to upper surface 102. Thus, in this example, not shown, upper surface 102 of dolly 100 may be continuous and ramp nubs 212 would not be visible from above. In such fashion, moving equipment onto upper surface 102 may be further simplified, as wheels rolling over the regions where apertures 106 are present would not encounter a disrupted surface, which can be inconvenient and may also cause wheels on the equipment to hang up and require further pushing as the equipment is moved up ramp 200 and onto dolly 100. It is further contemplated, however, that such can be minimized by having a planar profile of ramp nubs 212 that is generally coplanar with upper surface 102 such that any gaps between ramp nubs 212 and the edges of apertures 106 is minimized when wheels are rolled over ramp nubs 212.

Figure 6A:
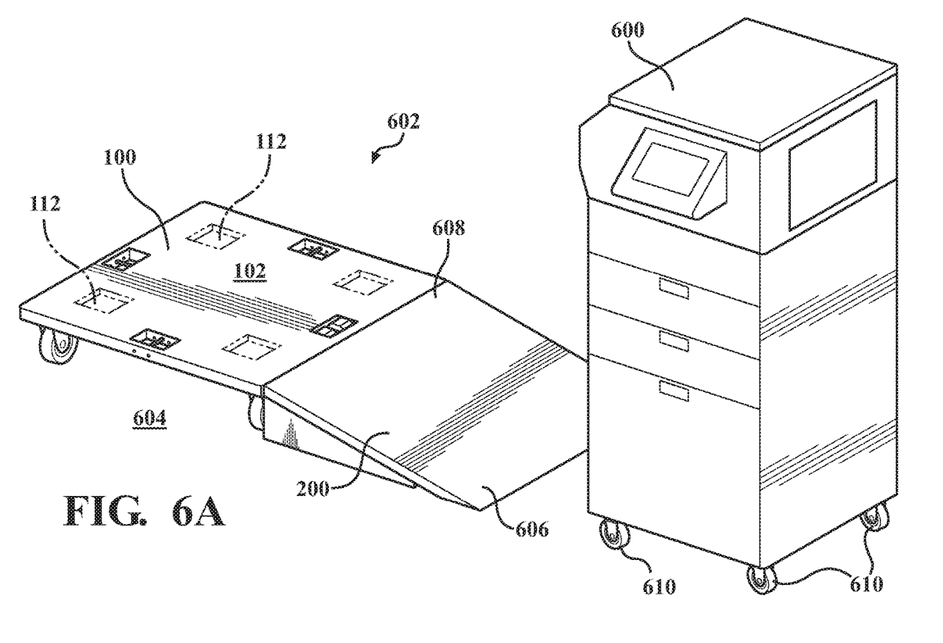
FIGS. 6A-6C show the single unit of the ramp and dolly of FIGS. 5A-5C in use to position an exemplary piece of office equipment thereon.
Figure 6B:
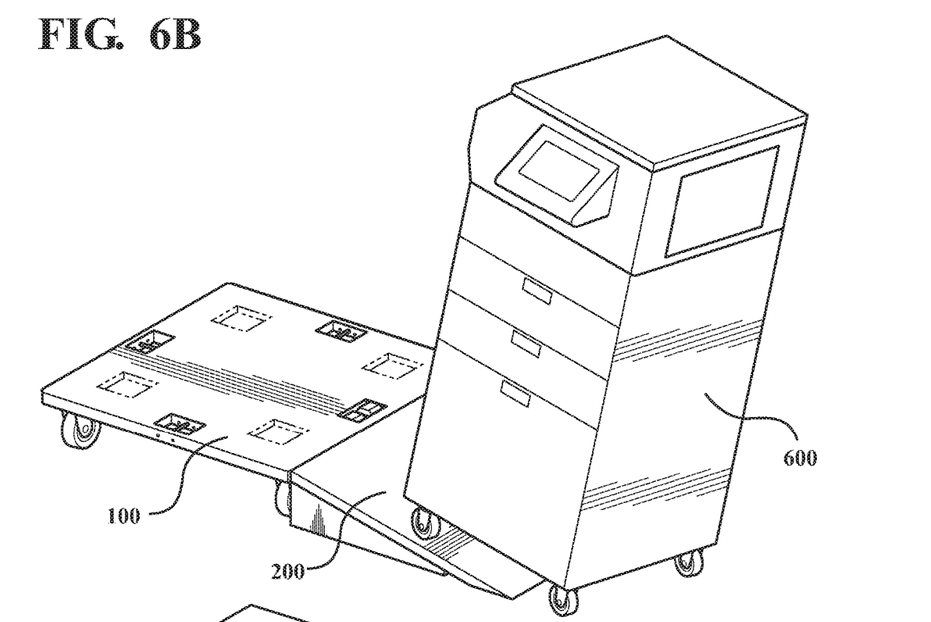
Figure 6C:
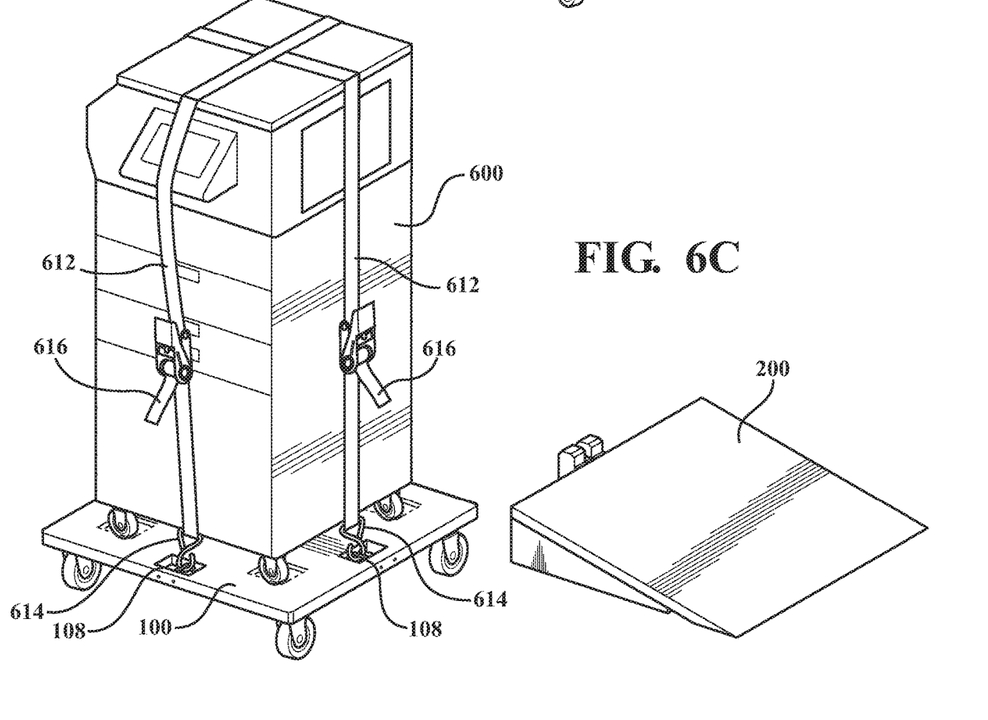

FIGS. 6A-6C show the single unit of the ramp and dolly of FIGS. 5A-5C in use to position an exemplary piece of office equipment thereon. FIG. 6A shows a single unit 602 and equipment 600 positioned proximate thereto. Equipment 600 in the illustrated example is a printer, but it is contemplated that equipment 600 may be any type of office or other piece of furniture or equipment, including but not limited to copiers, fax machines, computers, file cabinets, and furniture. Single unit 602 includes ramp 200 having an upper angled surface 606 that extends from a lower location corresponding approximately with a base surface 604 on which ramp 200 is positioned, to an upper location 608 corresponding approximately with upper planar surface 102 of dolly 100. Dolly 100 further includes depressions 112 in upper planar surface 102 that receives wheels 610 to be positioned on upper planar surface 104.

FIG. 6B shows office equipment 600 part way up ramp 200 and before being positioned on dolly 100. FIG. 6C shows office equipment 600 positioned on dolly 100 and attached thereto via straps 612. Straps 612 include hooks 614 that are positioned within rungs 108. Straps 612 are tightened, in the illustrated example, using a ratchet or "come-along" 616 to secure office equipment 600 to dolly 100. Ramp 200 is shown removed from dolly 100, having been lifted and angled in such a way that ramp nubs 212 are separated from aperture 106.

Figure 7:
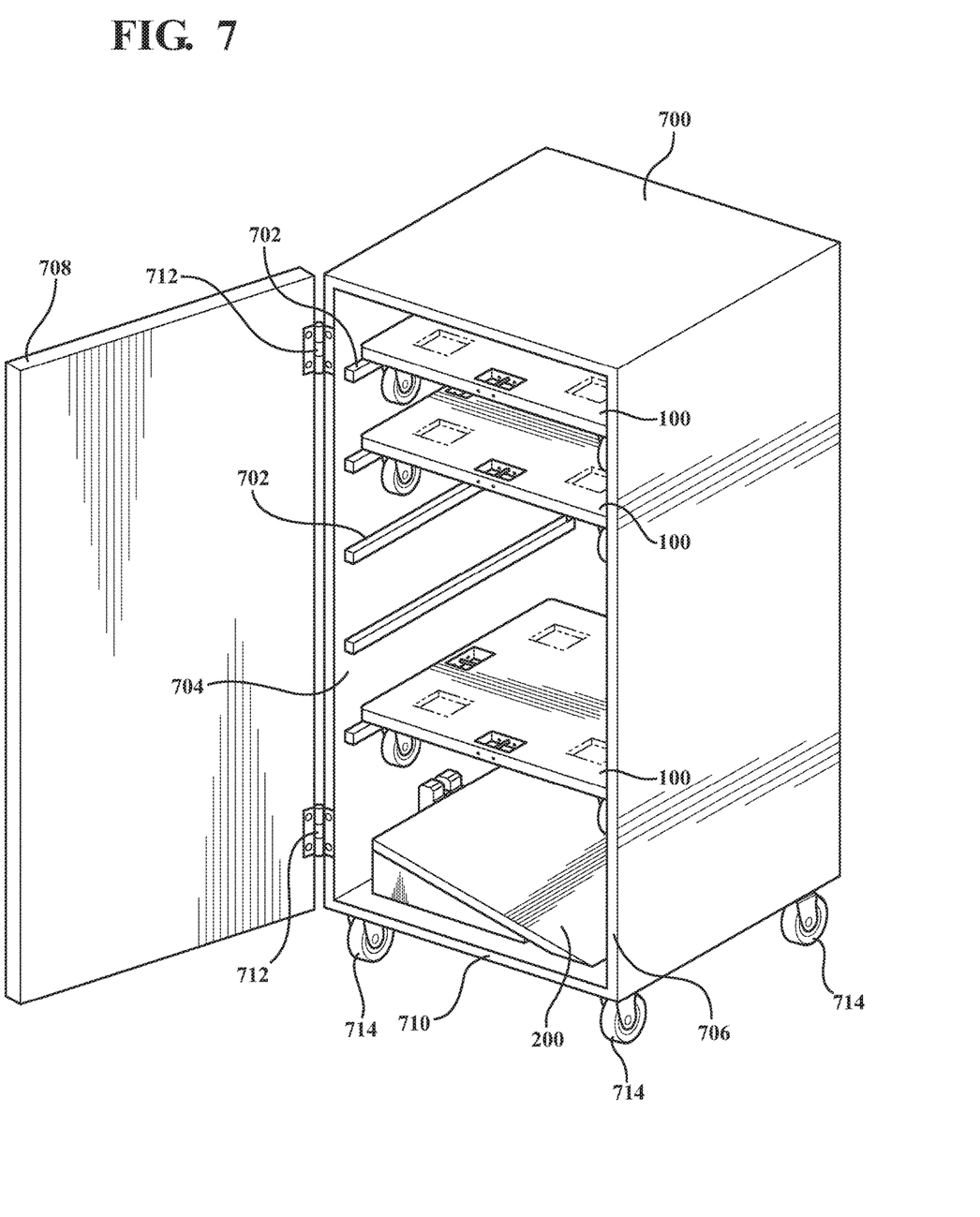
FIG. 7 shows a locker for holding both ramps and dollies of FIGS. 1 and 3.

FIG. 7 shows a locker 700 for holding one or more ramps 200 and one or more dollies 100 of FIGS. 1 and 3. Locker 700 includes ledged 702 attached to sides 704, 706, positioned such that ramps 200 and dollies 100 may be positioned therein. A door 708 is attached to a face 710 of locker 700 via hinges 712. Locker 700 includes wheels or castors 714. In use, ramps 200 and dollies 100 are positioned in locker 700 and door 708 is closed using a latch (not shown). Locker 700 may be conveniently transported within a warehouse or other facility, or placed on a moving truck or other vehicle, where the ramps 200 and dollies 100 may thereby be moved to a convenient location where they may then be deployed during use. In one example, because ramp 200 may be used over and over again to load equipment onto dollies 100, it is contemplated that only one or two ramps may be included in locker 700, while several dollies 100 may be contained therein.

Figure 8:
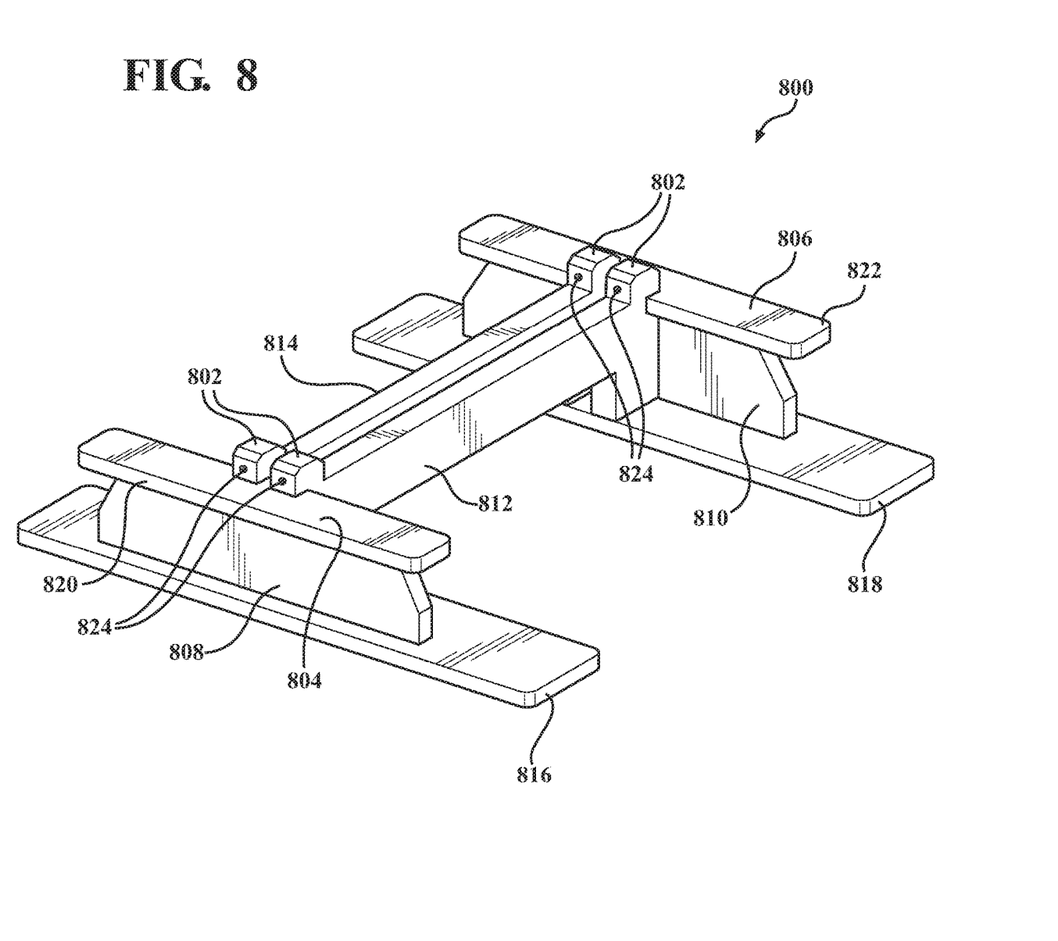
FIG. 8 shows a skid-converter according to the disclosure.

FIG. 8 shows a skid-converter 800 according to the disclosure. Skid-converter 800 includes upward-facing skid-converter nubs 802 that, when dolly 100 is positioned thereon, upward-facing skid-converter nubs 802 are positionable in respective apertures 106 such that dolly 100 may rest upon upper surfaces 804, 806 of skid-converter 800. Upper surfaces 804, 806 are supported by support bars 808, 810 and cross-beams 812, 814 are positioned therebetween. Base supports 816, 818 include support bars 808, 810 positioned thereon. Skid-converter nubs 802 are positioned having a spacing or "footprint" that matches with apertures 106 of dolly 100. Upper surfaces 804, 806 are surfaces corresponding to skid supports 820, 822.

Figure 9A:
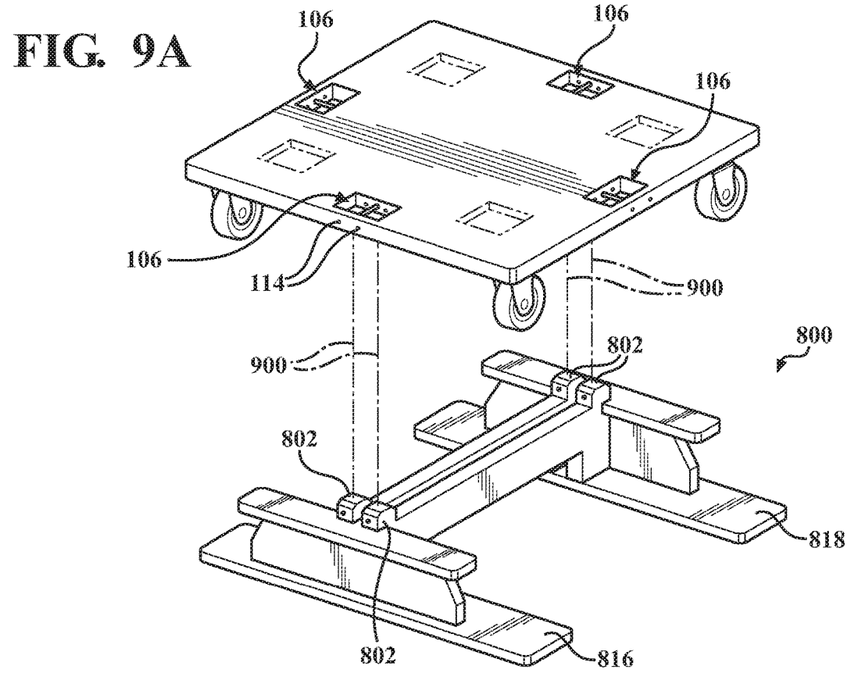
FIGS. 9A-9D show assembly of the skid-converter with a dolly.
Figure 9B:
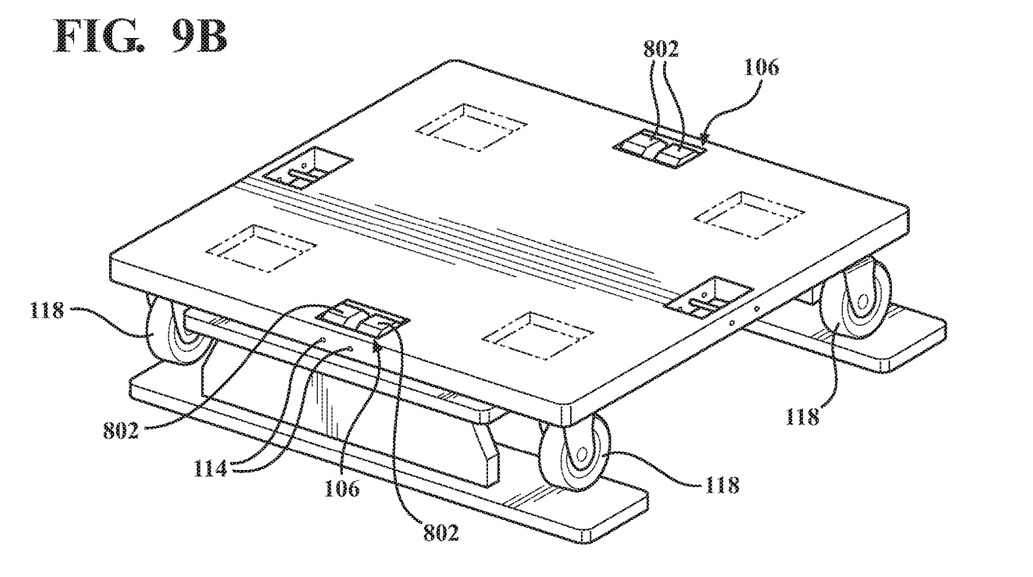
Figure 9C:
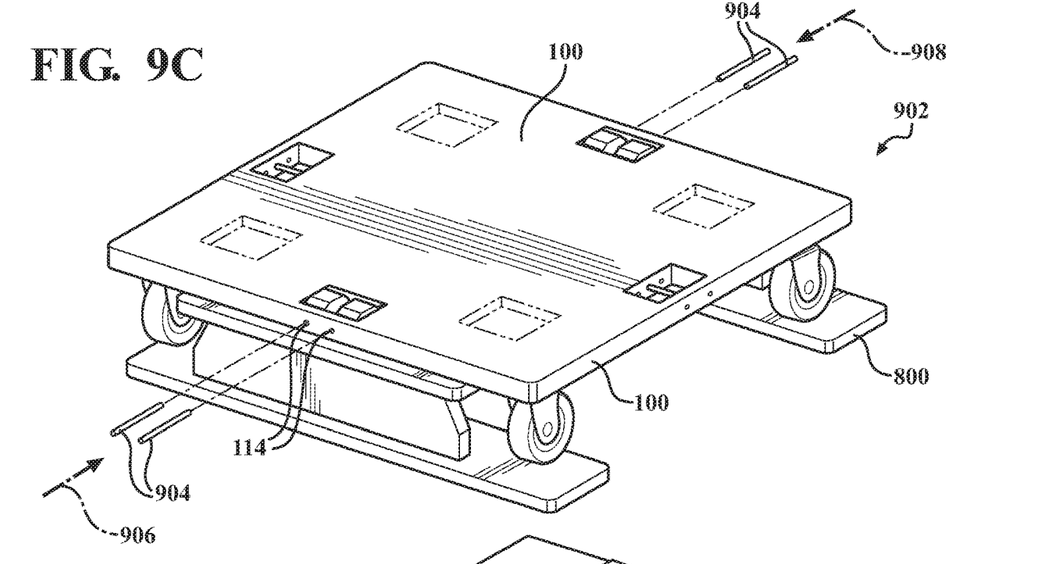
Figure 9D:
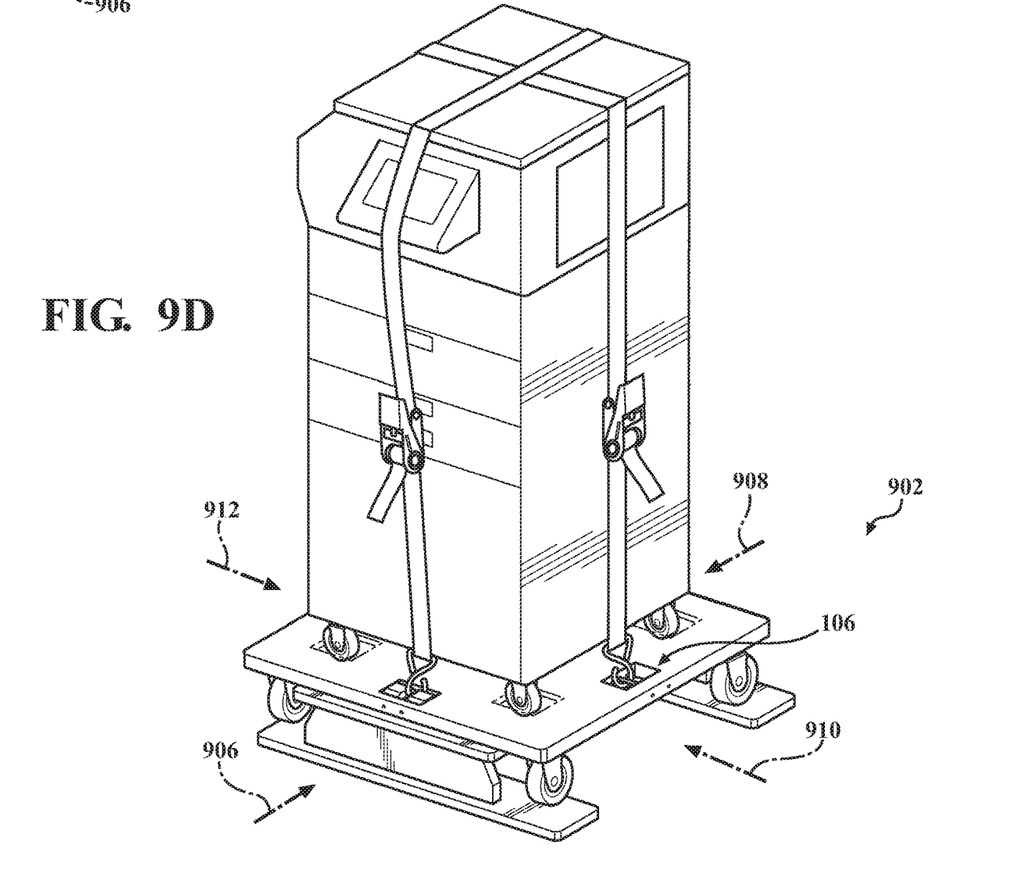

Referring to FIGS. 9A-9C, steps corresponding to the assembly of dolly 100 onto skid-converter 800 are illustrated, concluding in FIG. 9D and having a piece of office equipment positioned thereon and attached thereto. FIG. 9A shows dolly 100 above skid-converter 800 and having apertures 106 aligned 900 with skid-converter nubs 802. FIG. 9B shows dolly 100 positioned on skid-converter 800. Referring to FIG. 9A as well as the previous figures, lower surface 104 is thereby positioned on top of and in contact with upper surfaces 804, 806 of skid-converter 800. Skid-converter nubs 802 are positioned to pass through or extend into apertures 106. Upper surfaces 804, 806 are positioned at such an elevation, based on total thicknesses of base supports 816, 818, support bars 808, 810, and skid supports 820, 822. Upper surfaces 804, 806 are thereby positioned such that castors 118 are positioned above base supports 816, 818 and in the illustrated example are actually suspended above base supports 816, 818 and not in contact. As such, a skid-dolly assembly 902 is formed when dolly 100 is positioned on skid-converter 800.

Referring to FIG. 9C, skid-dolly assembly 902, although a single unit, is separable by simply lifting dolly 100 off of skid-converter 800. Skid-dolly assembly 902 may thereby be used for supporting equipment, such as office equipment 600, and in a fashion where office equipment is securely attached and not at risk of rolling or being easily pushed over. However, according to the disclosure, dolly 100 and skid-converter 800 may be attached together via pins 904 according to the following. Referring back to FIGS. 1A and 1B and according to this example, dolly 100 includes pin holes 114. As also seen in FIG. 8, skid-converter 800 also includes skid-converter holes 824 which, when skid-converter nubs 802 are positioned in apertures 106, align with pin holes 114 of dolly 100. Pins 904 are pressed into pin holes 114, passed into skid-converter holes 824, and back into pin holes 114 inboard of apertures 106. As seen in FIG. 1B, pin holes 114 pass to either side of aperture 106, such that when pins 114 are positioned therein, dolly 100 is thereby locked tightly to skid-converter 800. Having pins 114 installed as such, dolly 100 and skid-converter 800 are thereby locked together as one unit.

Referring to FIG. 9D, skid-dolly assembly 902 is thereby included as a single unit, having pins 114 installed therein (not visible). Equipment 600 is thereby positioned on top of skid-dolly assembly 902 and strapped thereto in a fashion similar to that described with respect to FIG. 6C. In this example, however, skid-converter 800 is the bottom-most piece of the overall assembly, providing a stable and solid foundation for movement and storage of equipment 600. As can be appreciated, once skid-dolly assembly 902 is formed, it is contemplated that ramp 200 may be used to move equipment 600 onto skid-dolly assembly 902. That is, although skid-converter nubs and dolly apertures are unavailable in the apertures where pins are inserted 906, 908, it is understood that apertures 106 at locations 910, 912 remain available for use with ramp 200. It is further understood that, because of the elevational difference of dolly 100 due to its being positioned on skid-converter 800, in order to use in the illustrated position, it may be necessary to place additional material underneath ramp 200, when using skid-dolly assembly 902, to account for this difference in height.

Figure 10:
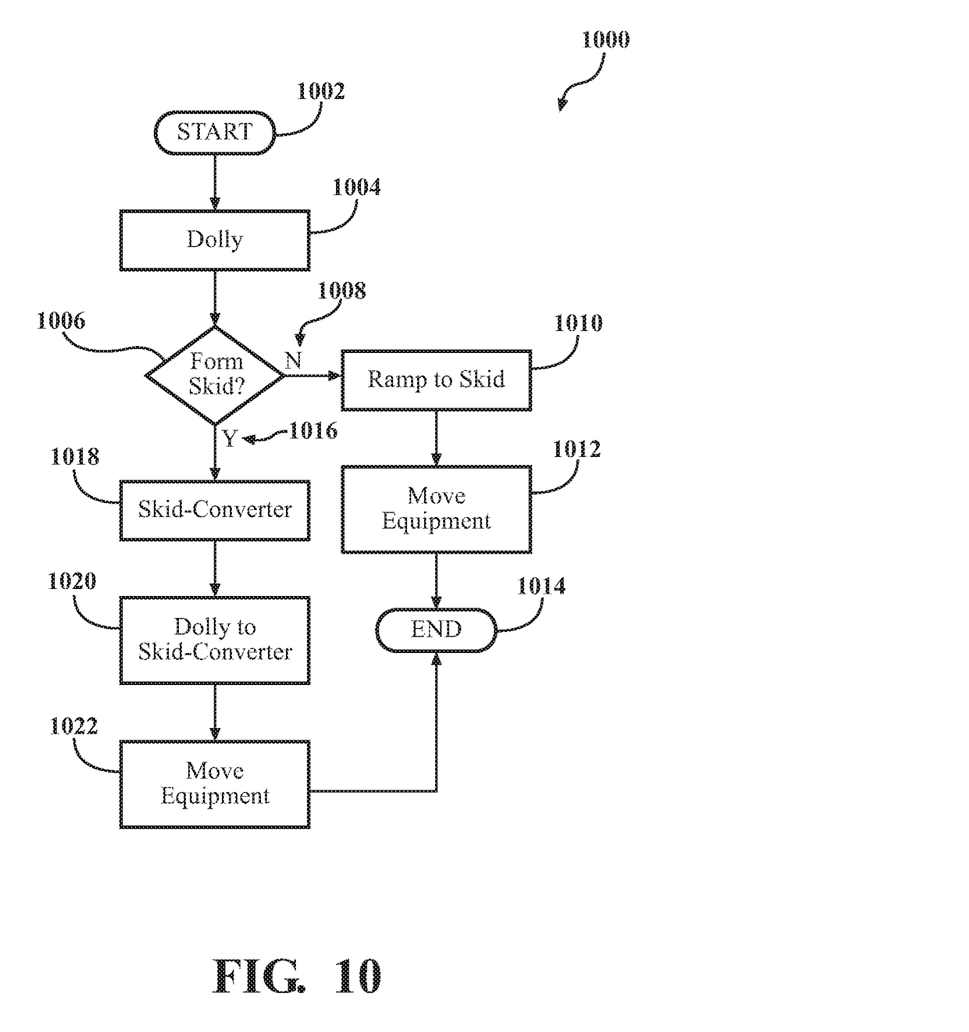
FIG. 10 steps corresponding with a method of fabricating a dolly assembly are disclosed.

Also according to the disclosure, a method of fabricating a dolly assembly is shown in FIG. 10. According to the above and referring to the figures, method 1000 starts 1002 and includes 1004 providing a dolly according to the disclosure. Method 1000 may include either fabricating or forming a skid via a skid-converter, or attaching or affixing a ramp to a skid. At step 1006, if no skid is to be formed 1008, then a ramp is provided for the dolly, the ramp having an extension that extends beyond an edge of the ramp and at least one upward-facing ramp nub. Step 1010 includes locking the ramp to the dolly by positioning the at least one nub in the aperture. At step 1012, with the ramp and skid formed together as a single unit, equipment may be moved in place and the method ends at 1014. Alternatively, if a skid is to be formed 1016, then a skid-converter is obtained at step 1018 and a dolly is attached to the skid-converter at step 1020 via the ramp nubs and the apertures in the dolly. Equipment is moved to the upper or top surface of the dolly when attached to the skid-converter at step 1022, and attached as desired. At step 1014 the method ends.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain arrangements, and should in no way be construed so as to limit the claimed invention.

Accordingly, it is to be understood that the above description is intended to be illustrative and not restrictive. Many applications other than the examples provided would be upon reading the above description. It is anticipated and intended that future developments will occur in the arts discussed herein, and that the disclosed systems and methods will be incorporated into such future arrangements. In sum, it should be understood that the invention is capable of modification and variation.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A dolly assembly, comprising:
   a dolly having an upper surface and a lower surface, and an aperture passing into at least the lower surface; and
   a ramp having an extension that extends beyond an edge of the ramp, the extension having at least one upward-facing ramp nub that, when positioned in the aperture, the ramp and the dolly are locked together as a first unit.

2. The dolly assembly of claim 1, wherein the aperture passes through both the lower surface and the upper surface of the dolly.

3. The dolly assembly of claim 2, further comprising a rung passing through the aperture and positioned below the upper surface, the rung configured to receive a harness for attaching an object to the upper surface of the dolly.

4. The dolly assembly of claim 3, wherein the at least one upward-facing ramp nub includes two upward-facing ramp nubs that are positioned laterally with respect to one another, each of the two upward-facing ramp nubs extending to either side of the rung.

5. The dolly assembly of claim 1, the ramp further comprising an upper angled surface that extends from approximately a lower location corresponding approximately with a base surface on which the ramp is positioned, to an upper location corresponding approximately with the upper surface of the dolly.

6. The dolly assembly of claim 1, the dolly further comprising at least one depression in the upper surface that receives a wheel to be positioned on the upper surface.

7. The dolly assembly of claim 1, further comprising a skid-converter that includes at least one upward-facing skid-converter nub that, when the dolly is positioned on the skid converter, the at least one upward-facing skid-converter nub is positioned in the aperture and the dolly rests upon one or more upper surfaces of the skid-converter.

8. The dolly assembly of claim 7, wherein the at least one upward-facing skid-converter nub includes two upward skid-converter nubs, each of the two upward-facing skid-converter nubs extending into the aperture.

9. The dolly assembly of claim 7, wherein the at least one upward-facing skid-converter nub includes a skid-converter pin hole passing therethrough, and the dolly includes a dolly pin hole proximate the aperture, such that when the dolly is positioned on the skid-converter the skid-converter pin hole and the dolly pin hole are aligned with one another, and when a pin is passed into the aligned holes, the skid-converter and the dolly are locked together as a second unit.

10. The dolly assembly of claim 1, wherein the dolly includes a plurality of castors for rolling the dolly on a base surface.

11. A method of fabricating a dolly assembly, comprising:
    providing a dolly having an upper surface and a lower surface, and an aperture passing through at least the lower surface;
    providing a ramp for the dolly, the ramp having an extension that extends beyond an edge of the ramp and at least one upward-facing ramp nub; and
    locking the ramp to the dolly as a first unit by positioning the at least one nub in the aperture.

12. The method of claim 11, wherein providing the dolly comprises the aperture passing through both the lower surface and the upper surface of the dolly.

13. The method of claim 12, further comprising passing a rung through the aperture that is positioned below the upper surface, the rung configured to receive a harness for attaching an object to the upper surface of the dolly.

14. The method of claim 13, wherein providing the ramp includes providing the at least one upward-facing ramp nub to include two upward-facing ramp nubs that are positioned laterally with respect to one another, each of the two upward-facing ramp nubs extending to either side of the rung.

15. The method of claim 11, wherein providing the ramp further comprises providing an upper angled surface that extends from approximately a lower location corresponding approximately with a base surface on which the ramp is positioned, to an upper location corresponding approximately with the upper surface of the dolly.

16. The method of claim 11, further comprising providing at least one depression in the upper surface of the dolly that receives a wheel to be positioned on the upper surface.

17. The method of claim 11, further comprising:
providing a skid-converter having at least one upward-facing skid-converter nub
positioning the on the skid converter such that the at least one upward-facing skid-converter nub is positioned in the aperture and the dolly rests upon one or more upper surfaces of the skid-converter.

18. The method of claim 17, wherein providing the ramp includes providing the at least one upward-facing skid-converter nub to include two upward skid-converter nubs, each of the two upward-facing skid-converter nubs extending into the aperture.

19. The method of claim 17, further comprising:
providing the skid-converter includes providing the at least one upward-facing skid-converter nub having a skid-converter pin hole passing therethrough;
providing the dolly includes providing a dolly pin hole proximate the aperture, such that when the dolly is positioned on the skid-converter the skid-converter pin hole and the dolly pin hole are aligned with one another; and
passing a pin into the aligned holes, locking the skid-converter and the dolly together as a second unit.

20. The method of claim 11, wherein providing the dolly includes providing a plurality of castors for rolling the dolly on a base surface.

* * * * *